(12) United States Patent
Liu et al.

(10) Patent No.: US 8,770,759 B2
(45) Date of Patent: Jul. 8, 2014

(54) LIQUID CRYSTAL GLASSES, PROJECTION DISPLAY SYSTEM AND CONTROL METHOD THEREOF

(75) Inventors: Chin-Ku Liu, Hsin-Chu (TW); Sze-Ke Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 604 days.

(21) Appl. No.: 12/903,219

(22) Filed: Oct. 13, 2010

(65) Prior Publication Data
US 2011/0115993 A1 May 19, 2011

(30) Foreign Application Priority Data
Nov. 18, 2009 (CN) .......................... 2009 1 0225248

(51) Int. Cl.
G03B 21/14 (2006.01)
G02F 1/1335 (2006.01)
G03B 35/26 (2006.01)

(52) U.S. Cl.
USPC .............. 353/8; 351/159.56; 349/13; 349/15; 359/465; 353/121

(58) Field of Classification Search
USPC .............. 353/7, 8, 20, 84; 352/57, 60, 62, 63; 349/13, 15; 359/464, 465; 348/57, 58; 351/163, 159.56, 159.27
See application file for complete search history.

(56) References Cited

U.S. PATENT DOCUMENTS

| 5,327,269 | A  | * | 7/1994 | Tilton et al. ...................... 349/33 |
| 6,943,852 | B2 | * | 9/2005 | Divelbiss et al. ............... 349/13 |
| 7,180,554 | B2 |   | 2/2007 | Divelbiss et al. |
| 8,179,427 | B2 | * | 5/2012 | Nemeth .......................... 348/58 |
| 8,184,215 | B2 | * | 5/2012 | Osterman et al. ............... 349/15 |
| 2008/0062259 | A1 | * | 3/2008 | Lipton et al. ..................... 348/58 |
| 2009/0066863 | A1 | * | 3/2009 | Chen .............................. 349/13 |
| 2012/0081623 | A1 | * | 4/2012 | Yamaguchi et al. ............ 349/15 |

FOREIGN PATENT DOCUMENTS

| TW | 548487 | 8/2003 |
| TW | 200836548 | 9/2008 |

* cited by examiner

*Primary Examiner* — William C Dowling
(74) *Attorney, Agent, or Firm* — Jianq Chyun IP Office

(57) ABSTRACT

A projection display system includes a glasses system, a driving unit and a projection apparatus. The driving unit is electrically connected to the glasses system for repeatedly applying or removing a voltage to/from the glasses system. The projection apparatus includes an illumination system and a color wheel. The color wheel is in a transmission path of a light beam provided by the illumination system. The color wheel has a compensation zone and a plurality of color zones. When the color wheel is rotated, the compensation zone and the color zones sequentially pass through the light beam. The compensation zone has first, second and third sub compensation zones. A time for the first sub compensation zone passing through the light beam is substantially equal to a time for the third sub compensation zone passing through the light beam. A liquid crystal glasses and a control method are also provided.

21 Claims, 12 Drawing Sheets

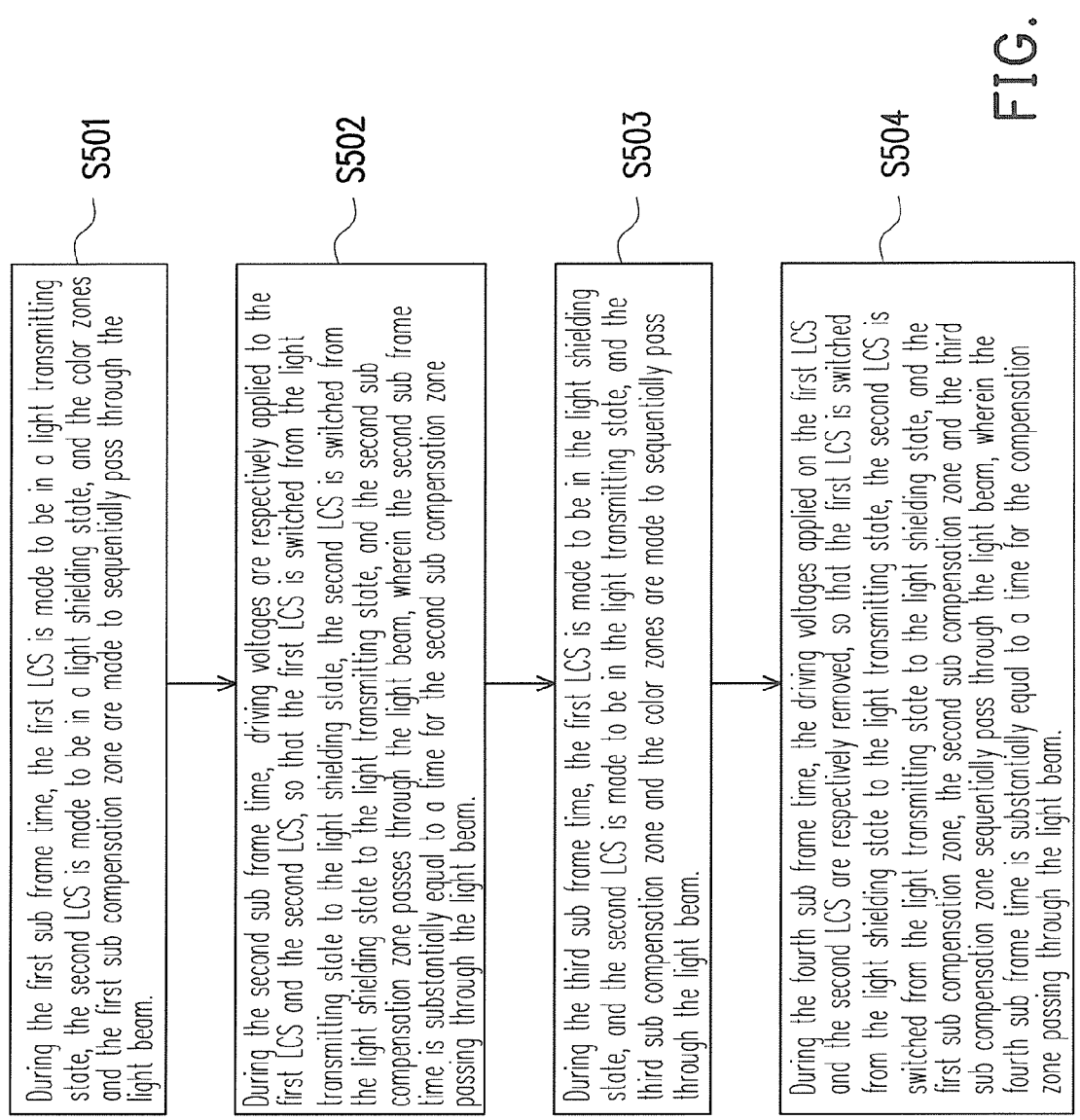

LIQUID CRYSTAL GLASSES, PROJECTION DISPLAY SYSTEM AND CONTROL METHOD THEREOF

CROSS-REFERENCE TO RELATED APPLICATION

This application claims the priority benefit of China application serial no. 200910225248.7, filed on Nov. 18, 2009. The entirety of the above-mentioned patent application is hereby incorporated by reference herein and made a part of this specification.

BACKGROUND OF THE INVENTION

1. Field of the Invention

The invention relates to a pair of glasses, a display system, and a control method thereof. More particularly, the invention relates to a pair of liquid crystal glasses, a projection display system, and a control method thereof.

2. Description of Related Art

With development of display technologies, besides features of lightness, slimness, shortness, and smallness, display devices are further developed to have a function of displaying three-dimensional (3D) images. Generally, a principle of displaying the 3D image is to respectively transmit two different images into a left eye and a right eye of a user, so that the user's brain may construct the 3D image.

Conventionally, a 3D projection display system is generally implemented by a projector and a pair of 3D glasses. Taking a digital light processing (DLP) projection technique as an example, a DLP projector is used together with a pair of 3D liquid crystal glasses.

Generally, each of the left and right lenses of the conventional 3D liquid crystal glasses uses a normally white liquid crystal shutter (LCS), wherein the normally white LCS is in a light transmitting state referred to as an ON state when a driving voltage is not applied, and the normally white LCS is in a light shielding stage referred to as an OFF state when the driving voltage is applied.

A time used for switching the ON/OFF states of the LCS is generally referred to as a response time. The response time includes a first switching time and a second switching time, wherein the first switching time is defined as a time required for switching the LCS from the ON state to the OFF state, and the second switching time is defined as a time required for switching the LCS from the OFF state to the ON state. Generally, twisted nematic (TN) or supero twisted nematic (STN) liquid crystal is used as the material of the LCS, so that the second switching time is greater than the first switching time.

To avoid a cross talk interference of the left and right eye images respectively transmitted by the DLP projector at different time, the switching time of the ON/OFF state all apply the second switching time, so as to avoid overlapping of the left and right eye images.

However, since the second switching time is greater than the first switching time, the above method may lead to an excessive long response time, a brightness reduction of the left and right eye images, an increasing of possibility of image flickering, and users' discomfort accordingly.

Moreover, FIGS. 1-4 of Taiwan Patent No. 548487 disclose a single-cell liquid crystal 3D shutter system including a linear polarizing film having a first polarization direction, a liquid crystal cell, an analyzer having the first polarization direction, and an analyzer having a second polarization direction, wherein the first polarization direction is perpendicular to the second polarization direction. Before an electric field is applied to the liquid crystal cell, the analyzer having the second polarization direction is pervious to light, and the analyzer having the first polarization direction is impervious to light. When the electric field is applied to the liquid crystal cell, the analyzer having the second polarization direction is impervious to light, and the analyzer having the first polarization direction is pervious to light. Moreover, FIG. 4 of the Taiwan Patent No. 548487 also discloses a design of switching the left and right glass lenses between a light transmitting state and a light shielding state.

Moreover, FIG. 3a and FIG. 3b of Taiwan Patent Publication No. 200836548 also disclose a projection display device including a controller, wherein the controller includes a synchronization signal generator, and the synchronization signal generator is, for example, a color wheel. To avoid the user sensing the synchronization signal, the synchronization signal may be displayed when the left and the right eye shutters are all closed. FIG. 4a of Taiwan Patent Publication No. 200836548 discloses shutter states of a pulse width modulation (PWM) sequence within a period of time, and traces thereof respectively represent a left eye shutter state and a right eye shutter state of an observing mechanism, wherein a time interval for switching the left eye shutter from the OFF state to the ON state is the same to a time interval for switching the right eye shutter from the ON state to the OFF state, and a time interval for switching the right eye shutter from the OFF state to the ON state is the same to a time interval for switching the left eye shutter from the ON state to the OFF state.

SUMMARY OF THE INVENTION

The invention is directed to a projection display system, and the projection display system may have a good brightness and color performance of a displayed image.

The invention is directed to a pair of liquid crystal glasses, and the pair of liquid crystal glasses may be applied to the aforementioned projection display system to obtain a good imaging quality.

The invention is directed to a control method, and the control method is applied to a projection display system to achieve a good brightness and color performance of a displayed image.

Other objects and advantages of the invention may be further illustrated by the technical features broadly embodied and described as follows.

An embodiment of the invention provides a projection display system including a glasses system, a driving unit, and a projection apparatus. The glasses system includes at least one first liquid crystal shutter (LCS) and at least one second LCS. The driving unit is electrically connected to the glasses system. When the driving unit respectively applies a first driving voltage and a second driving voltage to the first LCS and the second LCS, the first LCS is switched from a light transmitting state to a light shielding state within a first switching time, and the second LCS is switched from the light shielding state to the light transmitting state within the first switching time. After the first driving voltage and the second driving voltage respectively applied on the first LCS and the second LCS are removed, the first LCS is switched from the light shielding state to the light transmitting state within a second switching time, and the second LCS is switched from the light transmitting state to the light shielding state within the second switching time. The projection apparatus includes an illumination system and a color wheel. The illumination system is capable of providing a light beam, and the color wheel is disposed in a transmission path of the light beam.

After the light beam passes through the color wheel, the light beam is transmitted to the glasses system. The color wheel has a compensation zone and a plurality of color zones. When the color wheel is rotated, the compensation zone and the color zones sequentially pass through the light beam. The compensation zone has a first sub compensation zone, a second sub compensation zone, and a third sub compensation zone, wherein the second sub compensation zone is located between the first sub compensation zone and the third sub compensation zone. A time for the first sub compensation zone passing through the light beam is equal to a time for the third sub compensation zone passing through the light beam. The first switching time is substantially equal to a time for the second sub compensation zone passing through the light beam, and the second switching time is substantially equal to a sum of time for the first sub compensation zone, the second sub compensation zone, and the third sub compensation zone sequentially passing through the light beam.

Another embodiment of the invention provides a pair of liquid crystal glasses including a first LCS and a second LCS. The first LCS includes a first liquid crystal panel, a first polarizer, and a second polarizer. The first liquid crystal panel has a first surface and a second surface opposite to the first surface. The first polarizer is disposed on the first surface, and the second polarizer is disposed on the second surface, wherein a polarization direction of the second polarizer is perpendicular to a polarization direction of the first polarizer. The second LCS includes a second liquid crystal panel, a third polarizer, and a fourth polarizer. The second liquid crystal panel has a third surface and a fourth surface opposite to the third surface. The third polarizer is disposed on the third surface, and the fourth polarizer is disposed on the fourth surface, wherein a polarization direction of the fourth polarizer is parallel to a polarization direction of the third polarizer. When the first LCS and the second LCS are driven by a driving voltage, the first LCS is switched from a light transmitting state to a light shielding state, and the second LCS is switched from the light shielding state to the light transmitting state.

Another embodiment of the invention provides a control method adapted to the aforementioned projection display system, and the control method is adapted to control the projection display system during a plurality of successive frame times, wherein each of the frame times includes a first sub frame time, a second sub frame time, a third sub frame time, and a fourth sub frame time. The control method includes following steps. During the first sub frame time, the first LCS is made to be in a light transmitting state, and the second LCS is made to be in a light shielding state, and the color zones and the first sub compensation zone sequentially pass through the light beam. During the second sub frame time, a first driving voltage and a second driving voltage are respectively applied to the first LCS and the second LCS, so that the first LCS is switched from the light transmitting state to the light shielding state, and the second LCS is switched from the light shielding state to the light transmitting state, and the second sub compensation zone passes through the light beam, wherein the second sub frame time is substantially equal to a time for the second sub compensation zone passing through the light beam. During the third sub frame time, the first LCS is made to be in the light shielding state, and the second LCS is made to be in the light transmitting state, and the third sub compensation zone and the color zones sequentially pass through the light beam. During the fourth sub frame time, the first driving voltage and the second driving voltage applied to the first LCS and the second LCS are respectively removed, so that the first LCS is switched from the light shielding state to the light transmitting state, the second LCS is switched from the light transmitting state to the light shielding state, and the first sub compensation zone, the second sub compensation zone, and the third sub compensation zone sequentially pass through the light beam, wherein the fourth sub frame time is substantially equal to a time for the compensation zone passing through the light beam, and a time for the first sub compensation zone passing through the light beam is substantially equal to a time for the third sub compensation zone passing through the light beam.

In summary, the embodiment or embodiments of the invention may have at least one of the following advantages. In the projection display system according to the embodiment of the invention, by dividing the compensation zone of the color wheel into the first sub compensation zone, the second sub compensation zone, and the third sub compensation zone, the time for the second sub compensation zone passing through the light beam provided by an illumination system is substantially equal to the first switching time of the glasses system, and a sum of time for the first sub compensation zone, the second sub compensation zone, and the third sub compensation zone passing through the light beam is substantially equal to the second switching time of the glasses system. In this way, the brightness and color performance of the displayed image are improved. Moreover, the embodiment of the invention also provides a pair of liquid crystal glasses, wherein the first LCS and the second LCS respectively have a normally white mode and a normally black mode. Therefore, when the driving voltage is simultaneously applied or removed to/from the liquid crystal glasses, the first LCS and the second LCS may respectively receive different images at different time, so as to achieve an effect of receiving the three-dimensional images. In addition, the embodiment of the invention also provides a method for controlling the aforementioned projection display system capable of presenting a good three-dimensional image.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a flowchart illustrating a control method according to an embodiment of the invention.

DESCRIPTION OF THE EMBODIMENTS

Figure 1A:
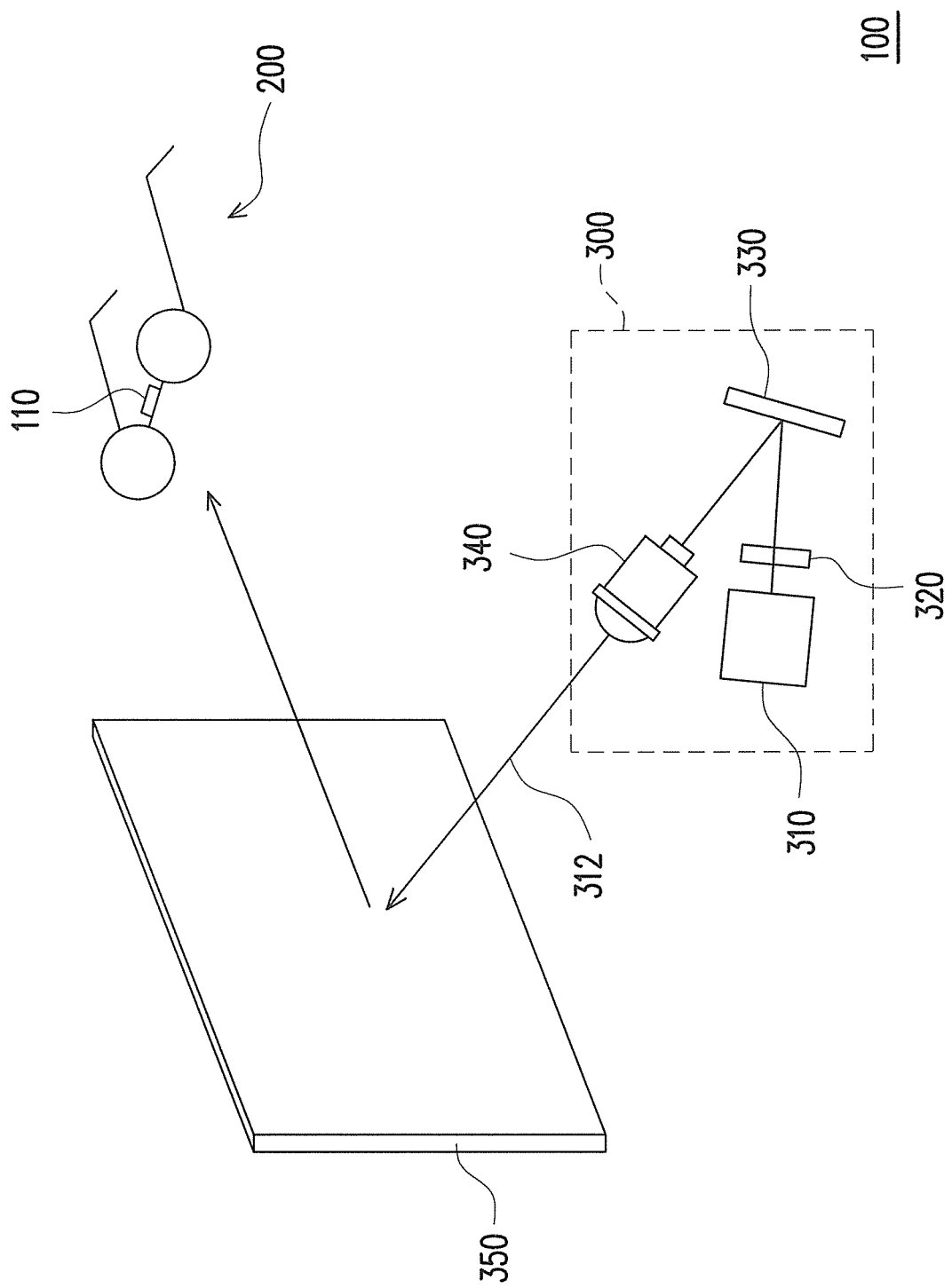
FIG. 1A is a schematic diagram illustrating a projection display system according to an embodiment of the invention.
Figure 1B:
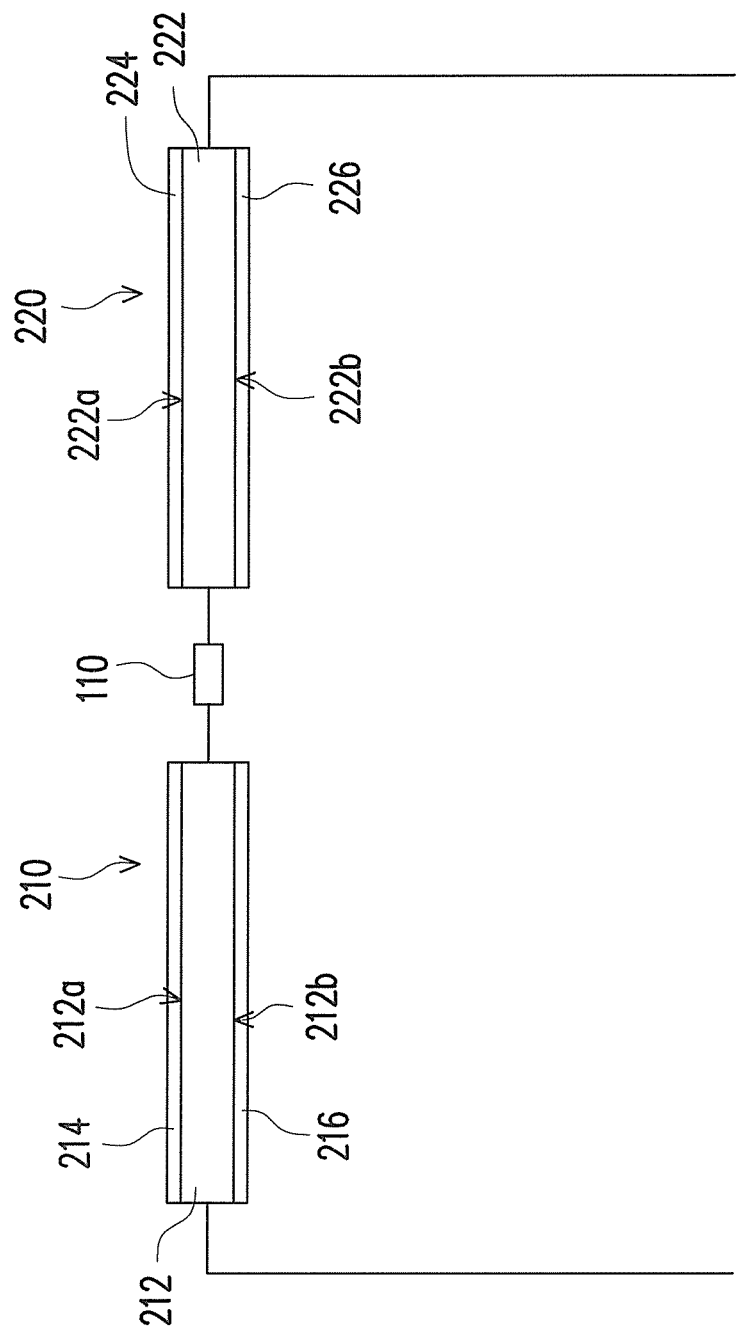
FIG. 1B is a top view of a pair of liquid crystal glasses of FIG. 1A.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the ten ns "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Referring to FIG. 1A, FIG. 1B, FIG. 1C, FIG. 1D and FIG. 1E, the projection display system 100 according to the embodiment includes a glasses system 200, a driving unit 110, and a projection apparatus 300. The glasses system 200 includes a first liquid crystal shutter (LCS) 210 and a second LCS 220. In the embodiment, the glasses system 200 is, for example, a pair of liquid crystal glasses illustrated in FIG. 1A and FIG. 1B. The pair of the liquid crystal glasses includes the first LCS 210 and the second LCS 220. Moreover, in the embodiment, the projection display system 100 is, for example, a three-dimensional (3D) projection display system. The first LCS 210 is, for example, in a normally white mode, and the second LCS 220 is, for example, in a normally black mode. In other words, when the first LCS 210 and the second LCS 220 are not driven, the first LCS 210 is in a light transmitting state, and the second LCS 220 is in a light shielding state. In the embodiment, the liquid crystal material used by the first LCS 210 and the second LCS 220 is, for example, a twisted nematic (TN) liquid crystal, though the invention is not limited thereto.

Figure 1C:
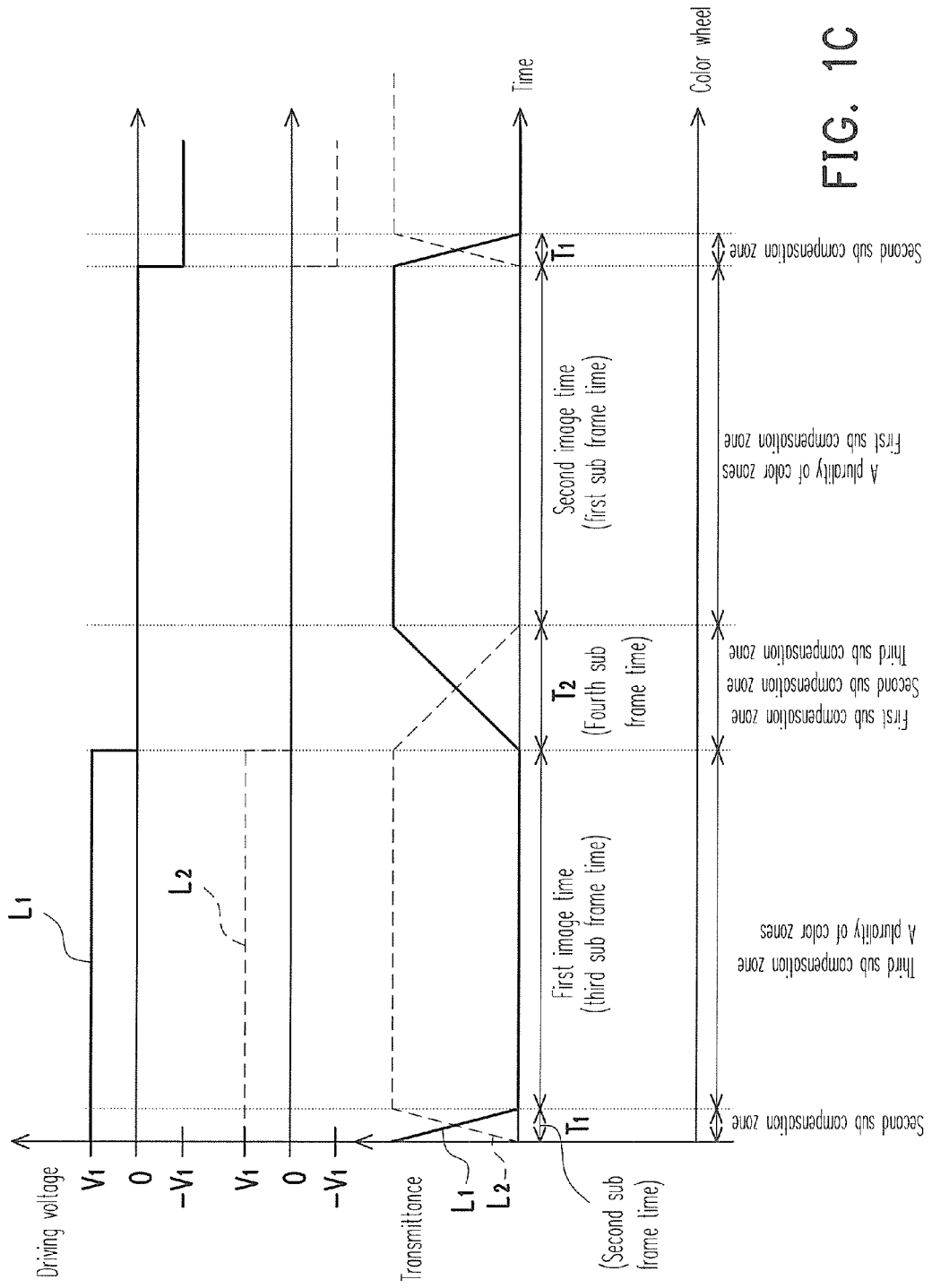
FIG. 1C is a schematic diagram of transmittances of a compensation zone and a plurality of color zones of a color wheel of FIG. 1A that are generated when a voltage is applied to a glasses system at different time.
Figure 1D:
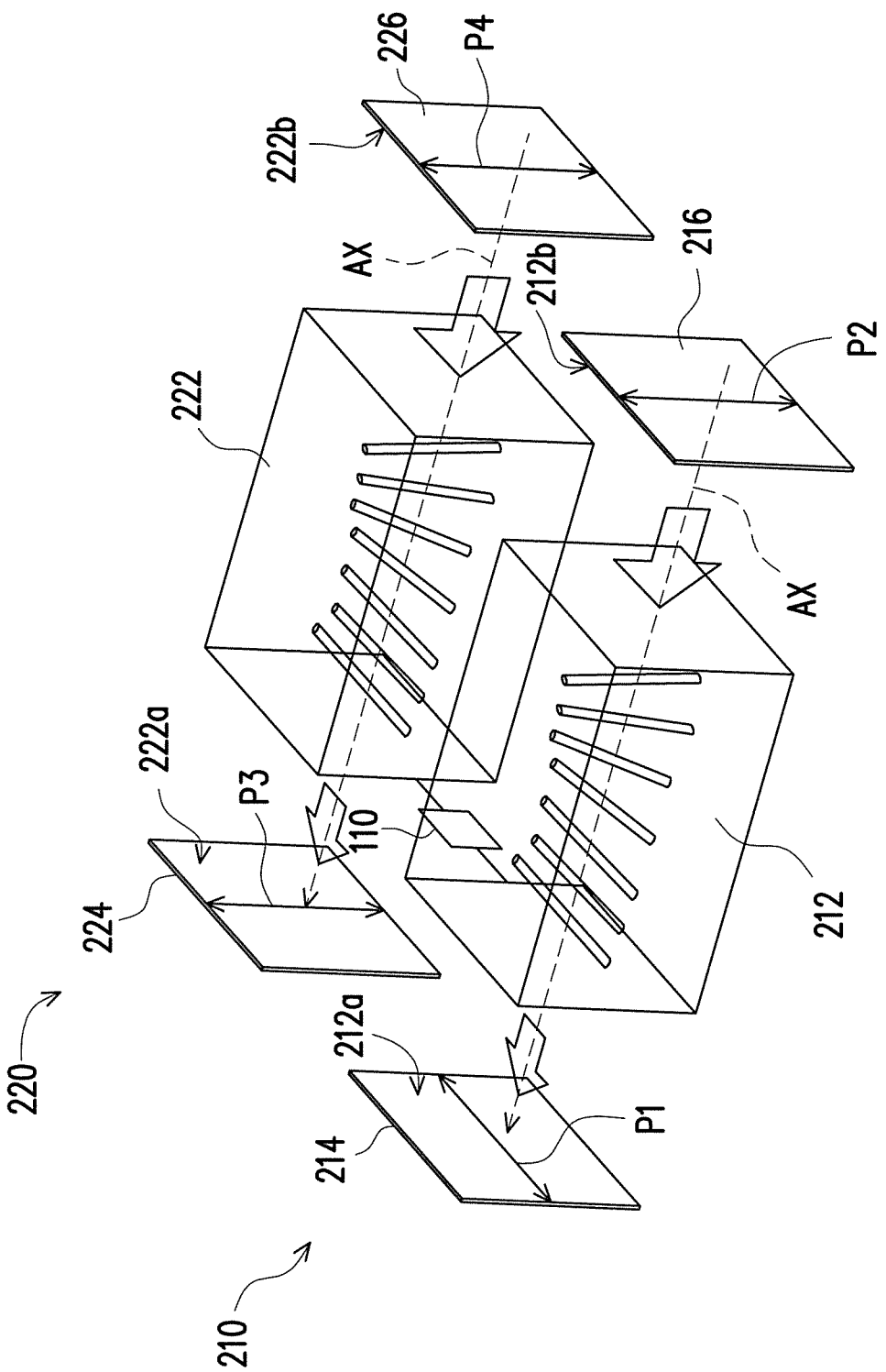
FIG. 1D is a schematic diagram illustrating the projection display system of FIG. 1A when electronic voltage is not applied on the first liquid crystal panel 212 and the second liquid crystal panel 222.

For example, in the glasses system 200, the first LCS 210 includes a first liquid crystal panel 212, a first polarizer 214 and a second polarizer 216. The first liquid crystal panel 212 has a first surface 212a and a second surface 212b opposite to the first surface 212a, and the first polarizer 214 and the second polarizer 216 are respectively disposed on the first surface 212a and the second surface 212b. The first polarizer 214 has a first polarization direction P1, and the second polarizer 216 has a second polarization direction P2, wherein the first polarization direction P1 is perpendicular to the second polarization direction P2, so that the first LCS 210 is in the normally white mode when the first LCS 210 is not driven, as shown in FIG. 1D. In addition, in the embodiment, the first polarization direction P1 of the first polarizer 214 is horizontal and the second polarization direction P2 of the second polarizer 216 is vertical for example. However, the invention is not limited thereto. In another embodiment, the first polarization direction P1 of the first polarizer 214 may rotate at a direction which is perpendicular to an optical axis AX, while the second polarization direction P2 of the second polarizer 216 may also rotate at a direction which is perpendicular to the optical axis AX, wherein the first polarization direction P1 and the second polarization direction P2 remain perpendicular.

The second LCS 220 includes a second liquid crystal panel 222, a third polarizer 224, and a fourth polarizer 226. The second liquid crystal panel 222 has a third surface 222a and a fourth surface 222b opposite to the third surface 222a, and the third polarizer 224 and the fourth polarizer 226 are respectively disposed on the third surface 222a and the fourth surface 222b. The third polarizer 224 has a third polarization direction P3, and the fourth polarizer 226 has a fourth polarization direction P4, wherein the third polarization direction P3 is parallel to the fourth polarization direction P4, so that the second LCS 220 is in the normally black mode when the second LCS 220 is not driven, as shown in FIG. 1D. In addition, in the embodiment, the third polarization direction P3 of the third polarizer 224 and the fourth polarization direction P4 of the fourth polarizer 226 are vertical for example. However, the invention is not limited thereto. In another embodiment, the third polarization direction P3 of the third polarizer 224 may rotate at a direction which is perpendicular to an optical axis AX, while the fourth polarization direction P4 of the fourth polarizer 226 may also rotate at a direction which is perpendicular to the optical axis AX, wherein the third polarization direction P3 and the fourth polarization direction P4 remain parallel.

Figure 1E:
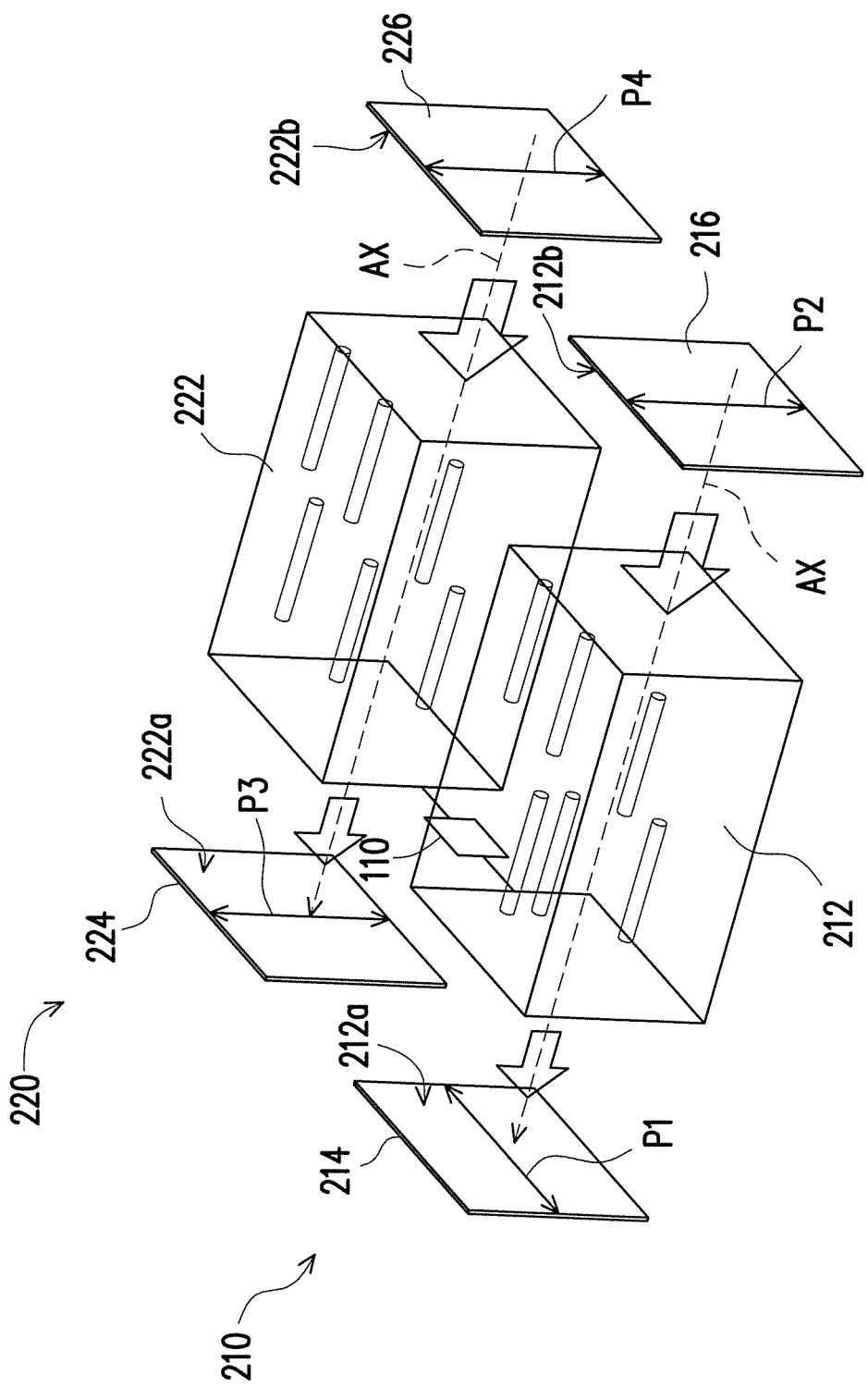
FIG. 1E is a schematic diagram illustrating the projection display system of FIG. 1A when electronic voltage is applied on the first liquid crystal panel 212 and the second liquid crystal panel 222.

The driving unit 110 is electrically connected to the glasses system 200. When the driving unit 110 applies a driving voltage V1 to the first LCS 210 and the second LCS 220, the first LCS 210 is switched from the light transmitting state to the light shielding state (i.e. a light transmittance of the first LCS 210 is reduced, as shown in FIG. 1E) within a first switching time T1, and the second LCS 220 is switched from the light shielding state to the light transmitting state (i.e. a light transmittance of the second LCS 220 is increased, as shown in FIG. 1E) within the first switching time T1 as shown in FIG. 1C. A solid line L1 of FIG. 1C represents a relationship between the driving voltage of the first LCS 210 and the light transmittance, and a dot line L2 represents a relationship between the driving voltage of the second LCS 220 and the light transmittance.

Moreover, when the driving voltage V1 applied to the first LCS 210 and the second LCS 220 is removed, the first LCS 210 is switched from the light shielding state to the light transmitting state within a second switching time T2, and the second LCS 220 is switched from the light transmitting state to the light shielding state within the second switching time T2 as shown in FIG. 1C. Generally, when the liquid crystal material used by the first LCS 210 and the second LCS 220 is the TN liquid crystal, a supero twisted nematic (STN) liquid crystal or other suitable liquid crystal materials, a time for applying the driving voltage to arrange liquid crystal molecules to desired positions is less than a time for removing the driving voltage to restore the liquid crystal molecules to their original positions. In other words, the second switching time T2 is generally greater than the first switching time T1.

Figure 2:
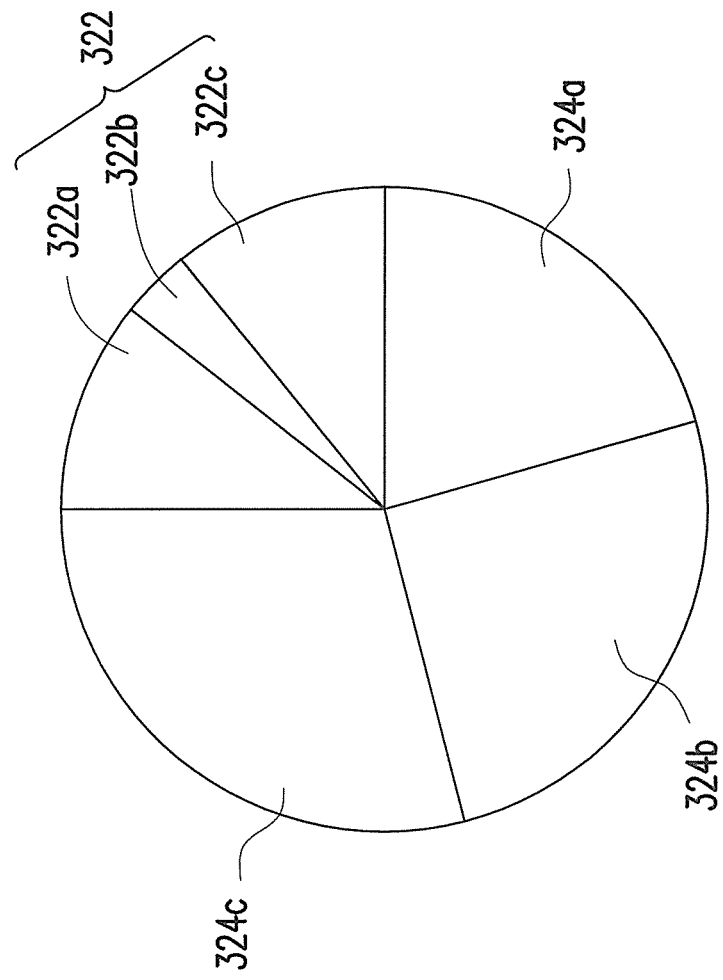
FIG. 2 is a schematic diagram illustrating distribution of a compensation zone and color zones on a color wheel according to an embodiment of the invention.

The projection apparatus 300 includes an illumination system 310 and a color wheel 320. The illumination system 310 is capable of providing a light beam 312, and the color wheel 320 is disposed in a transmission path of the light beam 312. After the light beam 312 passes through the color wheel 320, the light beam 312 is transmitted to the glasses system 200. Referring to FIG. 2, the color wheel 320 has a compensation zone 322 and a plurality of color zones 324a, 324b and 324c. When the color wheel 320 is rotated, the compensation zone 322 and the color zones 324a, 324b and 324c sequentially pass through the light beam 312. In the embodiment, the projection apparatus 300 further includes a light valve 330 and a projection lens 340, wherein the light valve 330 and the projection lens 340 are disposed in the transmission path of the light beam 312 as shown in FIG. 1A. After the light beam 312 from the color wheel 320 is transmitted to the light valve 330, the light beam 312 is reflected by the light valve 330 and transmitted to the projection lens 340, wherein the light beam 312 reflected by the light valve 330 carries image information. Then, the projection lens 340 projects the light beam 312 reflected by the light valve 330 onto a screen 350, and the light beam 312 is reflected by the screen 350 and is transmitted to the glasses system 200, so that a user wearing the glasses system 200 may observe an image.

In detail, when the projection display system 100 displays a 3D image, the projection apparatus 300 alternately projects a left-eye image and a right-eye image. When the left-eye image is projected, the LCS located at a left-eye position is in the light transmitting state, and the LCS located at a right-eye position is in the light shielding state. When the right-eye image is projected, the LCS located at the left-eye position is in the light shielding state, and the LCS located at the right-eye position is in the light transmitting state. In the embodiment, since the first LCS 210 and the second LCS 220 are respectively in the normally white mode and the normally black mode, after the driving voltage V1 is applied to the first LCS 210 and the second LCS 220, the first LCS 210 and the second LCS 220 are respectively in the light shielding state and the light transmitting state, so that one eye wearing the second LCS 220 may receive an image, and another eye wearing the first LCS 210 does not receive the image. Conversely, after the driving voltage V1 applied to the first LCS 210 and the second LCS 220 is removed, the first LCS 210 and the second LCS 220 are simultaneously respectively in the light transmitting state and the light shielding state, so that the eye wearing the first LCS 210 may receive another image, and the other eye wearing the second LCS 220 does not receive the image.

In other words, the glasses system 200 of the embodiment may apply the driving voltage V1 onto the first LCS 210 and the second LCS 220 or remove the driving voltage V1 applied on the first LCS 210 and the second LCS 220, so that two eyes of the user may respectively receive different image information at different time, so as to achieve a purpose of displaying the 3D image. However, since the second switching time T2 is greater than the first switching time T1, and a rotating speed of the color wheel 320 is generally fixed, thus, configurations of the compensation zone 322 and the color zones 324 on the color wheel 320 are required to be adjusted to generate a color sequence corresponding to the first switching time T1 and the second switching time T2. Embodiments are provided below for further descriptions, and the color wheel 320 is, for example, a round color wheel, though the invention is not limited thereto.

The compensation zone 322 has a first sub compensation zone 322a, a second sub compensation zone 322b, and a third sub compensation zone 322c, wherein the second sub compensation zone 322b is located between the first sub compensation zone 322a and the third sub compensation zone 322c as shown in FIG. 2. A time for the first sub compensation zone 322a passing through the light beam 312 is equal to a time for the third sub compensation zone 322c passing through the light beam 312. The first switching time T1 is substantially equal to a time for the second sub compensation zone 322b passing through the light beam 312, and the second switching time T2 is substantially equal to a sum of time for the first sub compensation zone 322a, the second sub compensation zone 322b, and the third sub compensation zone 322c sequentially passing through the light beam 312 as shown by a following Table 1, wherein the Table 1 is a color sequence table generated when the zones of the color wheel 320 of FIG. 2 sequentially pass through the light beam 312.

TABLE 1

| States Color of light beam after passing through color wheel | First switching time | First image | | | | Second switching time |
|---|---|---|---|---|---|---|
| | White light (second sub compensation zone) | White light (third sub compensation zone) | Blue light | Red light | Green light | White light (first sub compensation zone) |
| | | | | Color zones | | |

TABLE 1-continued

| States Color of light beam after passing through color wheel | Second switching time | | Second image | | | |
|---|---|---|---|---|---|---|
| | White light (second sub compensation zone) | White light (third sub compensation zone) | Blue light | Red light | Green light | White light (first sub compensation zone) |
| | | | Color zones | | | |
| Angle on color wheel | 12° | 39° | 75° | 90° | 105° | 39° |
| Turns of color wheel rotation | | | Second turn (360°) | | | |

In the embodiment, referring to FIG. 1C, FIG. 2 and the Table 1, during the first switching time T1 of applying the driving voltage V1, the first LCS 210 is switched from the light transmitting state to the light shielding state, and the second LCS 220 is switched from the light shielding state to the light transmitting state, and the second sub compensation zone 322b passes through the light beam 312. For example, during the first switching time T1, since the left and right eye image information are not required, the second sub compensation zone 322b may be transparent and colorless, so that the light beam 312 passing through the second subs compensation zone 322b may be a white light as shown in FIG. 1C, FIG. 2 and the Table 1.

Then, while the driving voltage V1 is maintained, the first LCS 210 is in the light shielding state, and the second LCS 220 is in the light transmitting state, and now the third sub compensation zone 322c and the color zones 324a, 324b, and 324c sequentially pass through the light beam 312, so as to generate a first image information and transmit the first image information to the glasses system 200, so that the second LCS 220 may receive the first image information, wherein colors of the color zones 324a, 324b, and 324c may be sequentially blue, red, and green as shown in FIG. 2 and the Table 1.

Then, after the driving voltage V1 applied on the first LCS 210 and the second LCS 220 is removed, the first LCS 210 is switched from the light shielding state to the light transmitting state within the second switching time T2, and the second LCS 220 is switched from the light transmitting state to the light shielding state within the second switching time T2, and the first sub compensation zone 322a, the second sub compensation zone 322b, and the third sub compensation zone 322c sequentially pass through the light beam 312 as shown in FIG. 1C, FIG. 2, and the Table 1. In other words, the second switching time T2 is substantially equal to a sum of time for the first sub compensation zone 322a, the second sub compensation zone 322b, and the third sub compensation zone 322c sequentially passing through the light beam 312. In the embodiment, the colors of the first sub compensation zone 322a, the second sub compensation zone 322b, and the third sub compensation zone 322c are the same.

Then, after the driving voltage V1 is removed, and the first LCS 210 is maintained in the light transmitting state, and the second LCS 220 is maintained in the light shielding state, the color zones 324a, 324b, and 324c and the first sub compensation zone 322a sequentially pass through the light beam 312, so as to generate a second image information and transmit the second image information to the glasses system 200, so that the first LCS 210 may receive the second image information, wherein colors of the color zones 324a, 324b, and 324c may be sequentially blue, red, and green as shown in FIG. 2 and the Table 1.

It should be noticed that in another embodiment that is not illustrated, since the second sub compensation zone 322b is unnecessary to display the first image information and the second image information during the first switching time T1 and the second switching time T2, the second sub compensation zone 322b may have a color different from the colors of the first sub compensation zone 322a and the third sub compensation zone 322c, wherein the colors of the first sub compensation zone 322a and the third sub compensation zone 322c are the same.

According to the Table 1, after the color wheel of FIG. 2 is rotated for two turns, the projection display system 100 may respectively provide the first image and the second image to the second LCS 220 and the first LCS 210 at different time, so as to achieve the 3D imaging mechanism. Moreover, the compensation zone 322 is divided into three sub compensation zones 322a, 322b, and 322c, wherein the time for the second sub compensation zone 322b passing through the light beam 312 is substantially equal to the first switching time T1, and a sum of time for the first sub compensation zone 322a, the second sub compensation zone 322b, and the third sub compensation zone 322c sequentially passing through the light beam 312 is defined to be the second switching time T2. In this way, in case of a same rotation speed of the color wheel 320, problems caused by the different first switching time T1 and second switching time T2 may be resolved.

Moreover, the projection display system 100 respectively provides the first image and the second image to the second LCS 220 and the first LCS 210 during one frame time, wherein the frame time contains the first switching time T1 and the second switching time T2. Compared to a design of the conventional projection display system applying the second switching time T2 for twice during one frame time, the projection display system 100 of the embodiment may prolong a display time of the first image and the second image, so as to achieve a better brightness and color performance of the displayed image.

Figure 3:
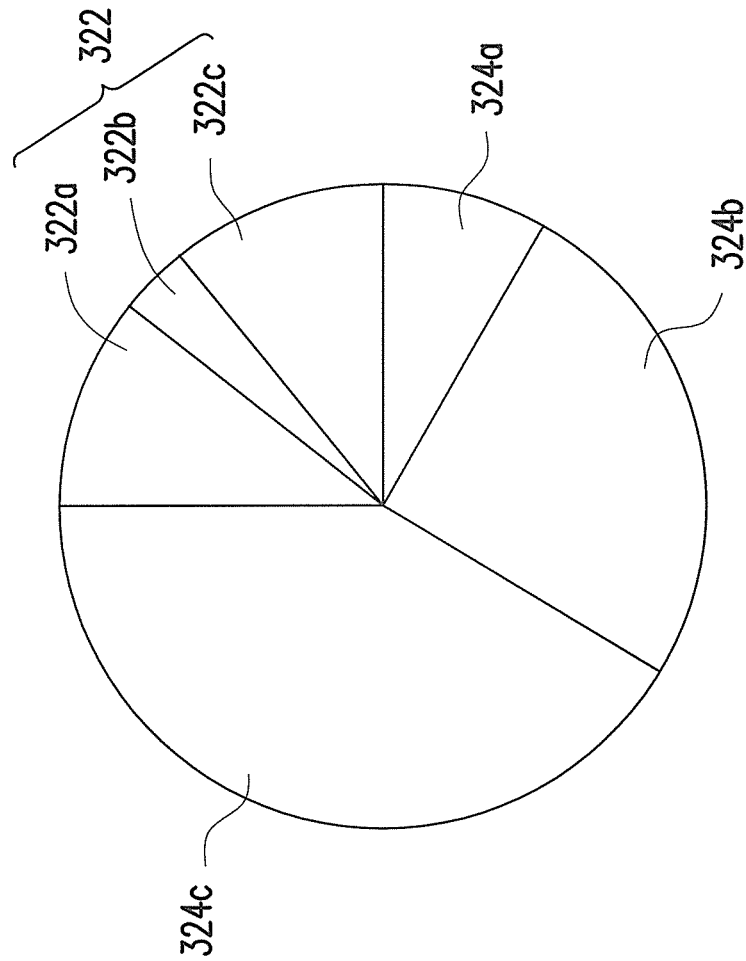
FIG. 3 is a schematic diagram illustrating distribution of a compensation zone and color zones on a color wheel according to another embodiment of the invention.

Moreover, a following Table 2 is a color sequence table generated when the zones of the color wheel of FIG. 3 sequentially pass through the light beam 312.

transmitting state, and the second sub compensation zone 322b passes through the light beam 312. During the first switching time T1, since the left and right eye image information are not required, a color of the second sub compensation zone 322b may be red, so that the light beam 312 passing through the second sub compensation zone 322b may be a red light, as shown in FIG. 1C, FIG. 3 and the Table 2.

Then, while the driving voltage V1 is maintained, the first LCS 210 is in the light shielding state, and the second LCS 220 is in the light transmitting state, and now the third sub compensation zone 322c and the color zones 324a, 324b, and 324c sequentially pass through the light beam 312, so as to generate a first image information and transmit the first image information to the glasses system 200, so that the second LCS 220 may receive the first image information, wherein a color of the third sub compensation zone 322c is red, and colors of

TABLE 2

| States Color of light beam after passing through color wheel | First switching time | First image | | | Second switching time |
|---|---|---|---|---|---|
| | Red light (second sub compensation zone) | Red light (third sub compensation zone) | Red light | Blue light | Green light | Red light (first sub compensation zone) |
| | | | (Color zones) | | |
| Angle on color wheel | 12° | 39° | 30° | 90° | 150° | 39° |
| Turns of color wheel rotation | | First turn (360°) | | | |

| States Color of light beam after passing through color wheel | Second switching time | Second image | | | |
|---|---|---|---|---|---|
| | Red light (second sub compensation zone) | Red light (third sub compensation zone) | Red light | Blue light | Green light | Red light (first sub compensation zone) |
| | | | (Color zones) | | |
| Angle on color wheel | 12° | 39° | 75° | 90° | 105° | 39° |
| Turns of color wheel rotation | | Second turn (360°) | | | |

Referring to FIG. 1C, FIG. 3, and the Table 2, in the embodiment, a color of the compensation zone 322 is the same as the color of one of the color zones 324a, 324b, and 324c. For example, the colors of the compensation zone 322 and the adjacent color zone 324a are all red as shown in FIG. 3 and the Table 2. In detail, when the projection display system 100 of the embodiment applies a color wheel design shown in FIG. 3 and the Table 2, an operation mechanism thereof is described as follows.

During the first switching time T1 of applying the driving voltage V1, the first LCS 210 is switched from the light transmitting state to the light shielding state, and the second LCS 220 is switched from the light shielding state to the light the color zones 324a, 324b, and 324c may be sequentially red, blue, and green as shown in FIG. 3 and the Table 2.

Then, after the driving voltage V1 applied on the first LCS 210 and the second LCS 220 is removed, the first LCS 210 is switched from the light shielding state to the light transmitting state within the second switching time T2, and the second LCS 220 is switched from the light transmitting state to the light shielding state within the second switching time T2, and the first sub compensation zone 322a, the second sub compensation zone 322b, and the third sub compensation zone 322c sequentially pass through the light beam 312 as shown in FIG. 1C, FIG. 3, and the Table 2. In other words, the second switching time T2 is substantially equal to a sum of time for the first sub compensation zone 322a, the second sub compensation zone 322b, and the third sub compensation zone 322c sequentially passing through the light beam 312. In the embodiment, the colors of the first sub compensation zone 322a, the second sub compensation zone 322b, and the third sub compensation zone 322c are the same, for example, red.

display system 100 of the embodiment also has the aforementioned advantages, and detailed descriptions thereof are not repeated.

Figure 4:
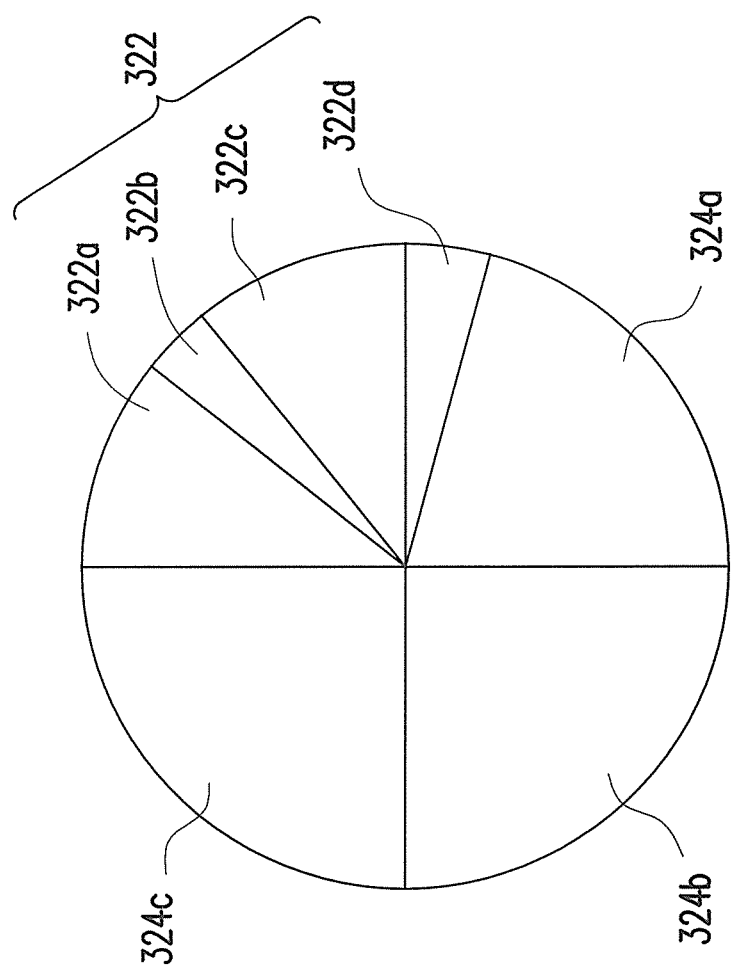
FIG. 4 is a schematic diagram illustrating distribution of a compensation zone and color zones on a color wheel according to another embodiment of the invention.

Moreover, a following Table 3 is a color sequence table generated when the zones of the color wheel of FIG. 4 sequentially pass through the light beam 312.

TABLE 3

| States Color of light | First switching time | First image | | | | | | |
|---|---|---|---|---|---|---|---|---|
| beam after passing through color wheel | White light (second sub compensation zone) | White light (third sub compensation zone) | White light (fourth sub compensation zone) | Blue light | Red light | Green light | | Second switching time White light (first sub compensation zone) |
| | | | | | (Color zones) | | | |
| Angle on color wheel | 12° | 39° | 15° | 75° | 90° | 90° | | 39° |
| Turns of color wheel rotation | | | First turn (360°) | | | | | |

| States Color of light | Second switching time | | Second image | | | | | |
|---|---|---|---|---|---|---|---|---|
| beam after passing through color wheel | White light (second sub compensation zone) | White light (third sub compensation zone) | White light (fourth sub compensation zone) | Blue light | Red light | Green light | | White light (first sub compensation zone) |
| | | | | | (Color zones) | | | |
| Angle ratio on color wheel | 12° | 39° | 15° | 75° | 90° | 90° | | 39° |
| Turns of color wheel rotation | | | Second turn (360°) | | | | | |

Then, after the driving voltage V1 is removed, and the first LCS 210 is maintained in the light transmitting state, and the second LCS 220 is maintained in the light shielding state, the color zones 324a, 324b, and 324c and the first sub compensation zone 322a sequentially pass through the light beam 312, so as to generate a second image information and transmit the second image information to the glasses system 200, so that the first LCS 210 may receive the second image information, wherein a color of the first sub compensation zone 322a is red, and colors of the color zones 324a, 324b, and 324c may be sequentially red, blue, and green as shown in FIG. 3 and the Table 2.

Similarly, in another embodiment that is not illustrated, since the second sub compensation zone 322b is unnecessary to display the first image information and the second image information during the first switching time T1 and the second switching time T2, the second sub compensation zone 322b may have a color different to the colors of the first sub compensation zone 322a and the third sub compensation zone 322c, wherein the colors of the first sub compensation zone 322a and the third sub compensation zone 322c are the same, for example, red.

As described above, according to the Table 2, after the color wheel of FIG. 3 is rotated for two turns, the projection Referring to FIG. 4 and the Table 3, in the embodiment, the compensation zone 322 further includes a fourth sub compensation zone 322d, and after the third sub compensation zone 322c passes through the light beam 312, the fourth sub compensation zone 322d and the color zones 324a, 324b, and 324c sequentially pass through the light beam 312. In detail, when the projection display system 100 of the embodiment applies a color wheel design shown in FIG. 4 and the Table 3, an operation mechanism thereof is described as follows.

During the first switching time T1 of applying the driving voltage V1, the first LCS 210 is switched from the light transmitting state to the light shielding state, and the second LCS 220 is switched from the light shielding state to the light transmitting state, and the second sub compensation zone 322b passes through the light beam 312. During the first switching time T1, since the left and right eye image information are not required, a color of the second sub compensation zone 322b may be white, so that the light beam 312 passing through the second sub compensation zone 322b may be a white light as shown in FIG. 4 and the Table 3.

Then, while the driving voltage V1 is maintained, the first LCS 210 is in the light shielding state, and the second LCS 220 is in the light transmitting state, and now the third sub compensation zone 322c, the fourth sub compensation zone 322d, and the color zones 324a, 324b, and 324c sequentially pass through the light beam 312, so as to generate a first image information and transmit the first image information to the glasses system 200, so that the second LCS 220 may receive the first image information, wherein colors of the third sub compensation zone 322c, and the fourth sub compensation zone 322d are all white, and colors of the color zones 324a, 324b, and 324c may be sequentially blue, red, and green as shown in FIG. 4 and the Table 3.

Then, after the driving voltage V1 applied on the first LCS 210 and the second LCS 220 is removed, the first LCS 210 is switched from the light shielding state to the light transmitting state within the second switching time T2, and the second LCS 220 is switched from the light transmitting state to the light shielding state within the second switching time T2, and the first sub compensation zone 322a, the second sub compensation zone 322b, and the third sub compensation zone 322c sequentially pass through the light beam 312 as shown in FIG. 4 and the Table 3. In other words, the second switching time T2 is substantially equal to a sum of time for the first sub compensation zone 322a, the second sub compensation zone 322b, and the third sub compensation zone 322c sequentially passing through the light beam 312. In the embodiment, the colors of the first sub compensation zone 322a, the second sub compensation zone 322b, and the third sub compensation zone 322c are the same, for example, white.

Then, after the driving voltage V1 is removed, and the first LCS 210 is maintained in the light transmitting state, and the second LCS 220 is maintained in the light shielding state, the fourth sub compensation zone 322d, the color zones 324a, 324b, and 324c and the first sub compensation zone 322a sequentially pass through the light beam 312, so as to generate a second image information and transmit the second image information to the glasses system 200, so that the first LCS 210 may receive the second image information, wherein colors of the first sub compensation zone 322a and the fourth sub compensation zone are white, and colors of the color zones 324a, 324b, and 324c may be sequentially blue, red, and green as shown in FIG. 4 and the Table 3.

Similarly, in another embodiment that is not illustrated, since the second sub compensation zone 322b is unnecessary to display the first image information and the second image information during the first switching time T1 and the second switching time T2, the second sub compensation zone 322b may have a color different to the colors of the first sub compensation zone 322a, the third sub compensation zone 322c, and the fourth sub compensation zone 322d, wherein the colors of the first sub compensation zone 322a, the third sub compensation zone 322c, and the fourth sub compensation zone 322d are the same.

As described above, according to the Table 3, after the color wheel of FIG. 4 is rotated for two turns, the projection display system 100 of the embodiment also has the aforementioned advantages, and detailed descriptions thereof are not repeated.

It should be noticed that in the embodiment of FIG. 1A, the projection display system 100 is exemplarily shown as a reflective projection display system. However, in another embodiment, the projection display system 100 may also be a transmissive projection display system.

According to the above descriptions, an embodiment of the invention provides a control method as that shown in FIG. 5, wherein the control method is capable of controlling the aforementioned projection display system 100 during a plurality of successive frame times. Referring to FIG. 5, each of the frame times includes a first sub frame time, a second sub frame time, a third sub frame time, and a fourth sub frame time. In the embodiment, the first sub frame time, the second sub frame time, the third sub frame time, and the fourth sub frame time respectively correspond to the aforementioned time of displaying the second image, the first switching time T1, the time of displaying the first image, and the second switching time T2.

Referring to FIG. 1C and FIG. 5, in step S501, during the first sub frame time (i.e. the time of displaying the second image), the first LCS 210 is made to be in the light transmitting state, and the second LCS 220 is made to be in the light shielding state, and the color zones 324a, 324b, and 324c and the first sub compensation zone 322a sequentially pass through the light beam 312, so as to display the second image on the first LCS 210.

Next, in step S502, during the second sub frame time (i.e. the first switching time T1), the driving voltage V1 is applied to the first LCS 210 and the second LCS 220, so that the first LCS 210 is switched from the light transmitting state to the light shielding state, and the second LCS 220 is switched from the light shielding state to the light transmitting state, and the second sub compensation zone 322b passes through the light beam 312, wherein the second sub frame time is substantially equal to a time for the second sub compensation zone 322b passing through the light beam 312.

Next, in step S503, during the third sub frame time (the time of displaying the first image), the first LCS 210 is made to be in the light shielding state, and the second LCS 220 is made to be in the light transmitting state, and the third sub compensation zone 322c and the color zones 324a, 324b, and 324c sequentially pass through the light beam 312, so as to generate the first image on the second LCS 220.

Next, in step S504, during the fourth sub frame time (i.e. the second switching time T2), the driving voltage V1 applied to the first LCS 210 and the second LCS 220 is removed, so that the first LCS 210 is switched from the light shielding state to the light transmitting state, the second LCS 220 is switched from the light transmitting state to the light shielding state, and the first sub compensation zone 322a, the second sub compensation zone 322b, and the third sub compensation zone 322c sequentially pass through the light beam 312, wherein the fourth sub frame time is substantially equal to a time for the compensation zone 322 passing through the light beam 312, and a time for the first sub compensation zone 322a passing through the light beam 312 is substantially equal to a time for the third sub compensation zone 322c passing through the light beam 312 as shown in FIG. 1C and FIG. 5. By performing the above steps, the control method is implemented.

In the embodiment, regarding a method for applying the driving voltage to the first LCS 210 and the second LCS 220, a control signal may be transmitted from the projection apparatus 300 to the glasses system 200 through cable transmission or wireless transmission, so as to control the driving unit 110 of the glasses system 200 to apply the driving voltage V1 to the first LCS 210 and the second LCS 220. In other words, the control signal may be a synchronization signal, which means an infrared transmission module may be configured on the projection apparatus 300, and when the projection apparatus 300 projects images, or during a projection process, the infrared transmission module may transmit the synchronization signal to an infrared receiving module electrically connected to the driving unit 110, so that the first LCS 210 and the second LCS 220 may synchronously match each of the aforementioned frame times.

The control method of the invention further includes making the third sub compensation zone 322c, the fourth sub compensation zone 322d, and the color zones 324a, 324b, and

324c sequentially pass through the light beam 312 during the third sub frame time as described in the embodiments of FIG. 4 and the Table 3.

Moreover, in an embodiment that is not illustrated, during the first sub frame time, the control method further includes making the color zones 324a, 324b, 324c, the fourth sub compensation zone 322d, and the first sub compensation zone 322a sequentially pass through the light beam 312, wherein the fourth sub compensation zone 322d is located between the first sub compensation zone 322a and the color zone 324 (not shown).

In another embodiment of the invention, besides using the aforementioned infrared transmission module to synchronize the image displayed by the projection apparatus 300 with the liquid crystal glasses 200, another timing synchronization method may also be used, and the timing synchronization method is described as follows.

Figure 6A:
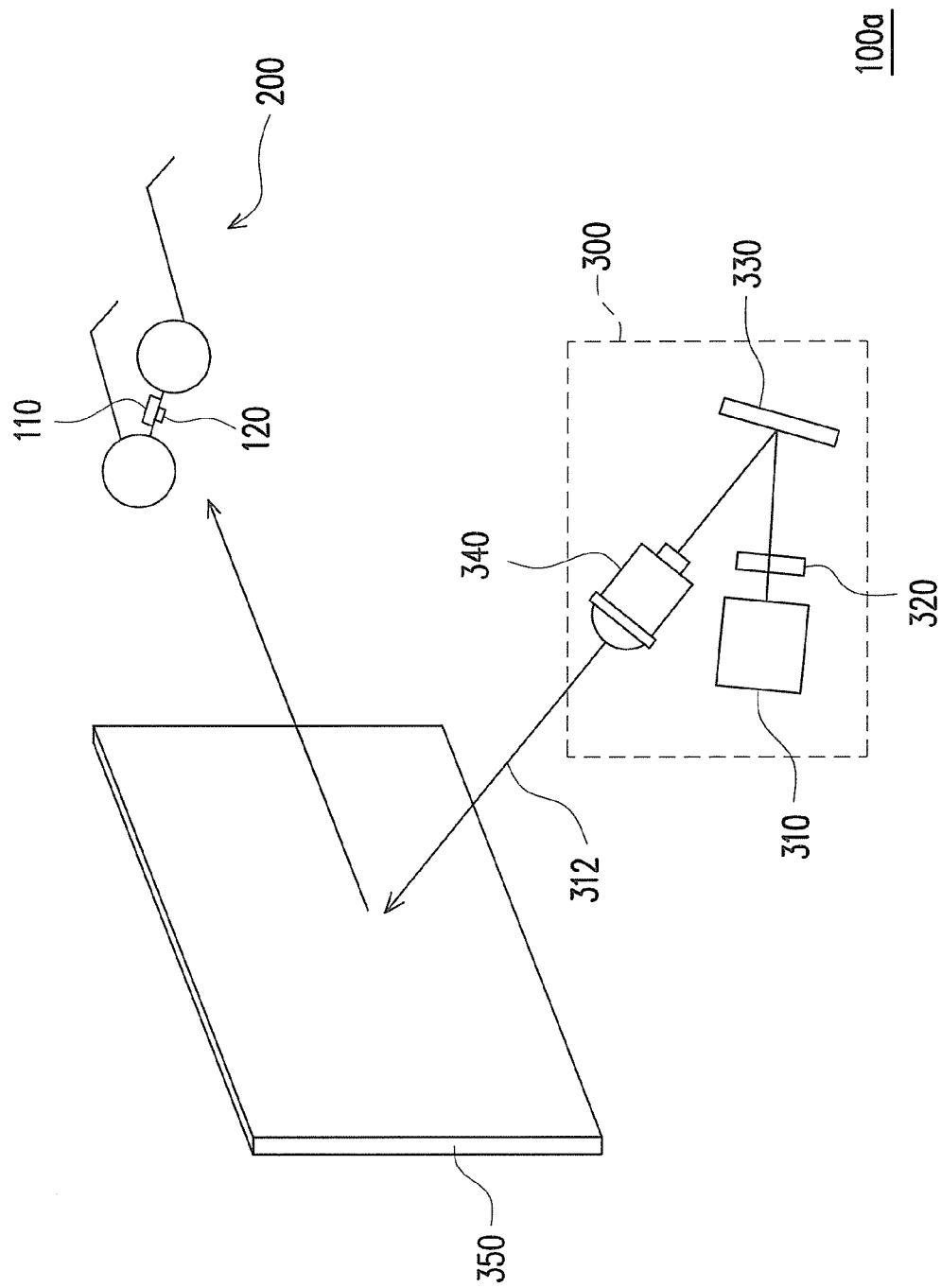
FIG. 6A is a schematic diagram illustrating a projection display system according to another embodiment of the invention.
Figure 6B:
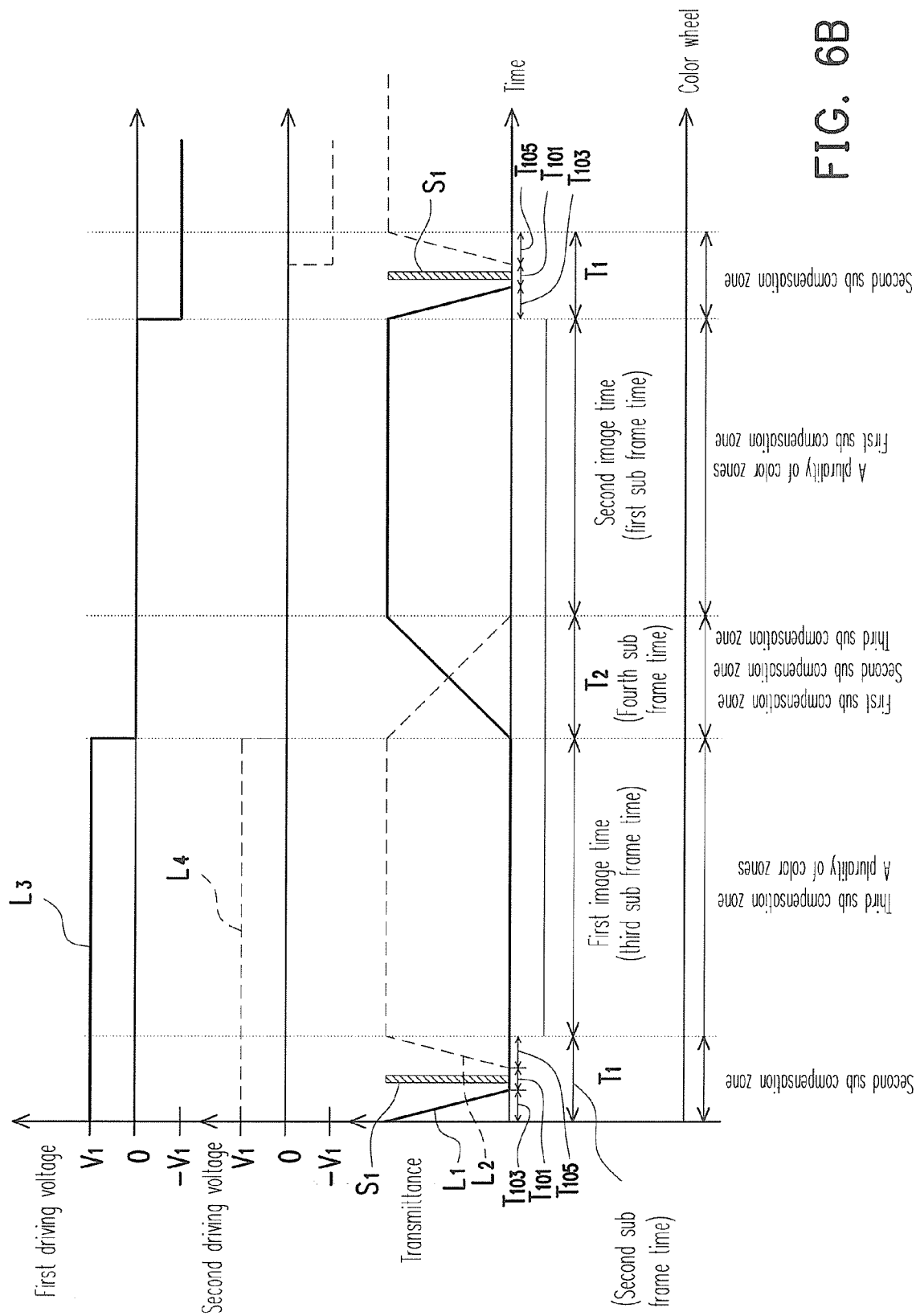
FIG. 6B is a schematic diagram of transmittances of a compensation zone and a plurality of color zones of a color wheel of FIG. 6A that are generated when a first driving voltage and a second driving voltage are respectively applied to a first liquid crystal shutter (LCS) and a second LCS at different time.

Referring to FIG. 6A and FIG. 6B, a solid line L3 represents a relationship between the first driving voltage applied to the first LCS and the light transmittance, and a dot line L4 represents a relationship between the second driving voltage applied to the second LCS and the light transmittance. Referring to FIG. 1A, FIG. 1C, FIG. 6A and FIG. 6B, the projection display system 100a of the embodiment is similar to the aforementioned projection display system 100, and a difference between the projection display system 100a and the projection display system 100 is that the projection display system 100a further includes a light sensor 120. The light sensor 120 is disposed in the glasses system 200, and is used for receiving a flashing signal S1 sent by the projection apparatus 300 during a synchronization time T101, so as to synchronize the LCSs 210 and 220 of the glasses system 200 with the images projected by the projection apparatus 300. Namely, when the images provided by the projection apparatus 300 are not matched to the states of the LCSs 210 and 220 of the glasses system 200, the LCSs 210 and 220 may be calibrated according to the flashing signal S1, so as to correct the state of the glasses system 200 to achieve a timing correction function.

Referring to FIG. 6A and FIG. 6B again, in the embodiment, a generation sequence of the synchronization time T101 is after a time T103 required for switching the first LCS 210 from the light transmitting state to the light shielding state, and before a time T105 required for switching the second LCS 220 from the light shielding state to the light transmitting state. Therefore, when the projection apparatus 300 sends the flashing signal S1, the first LCS 210 and the second LCS 220 are all in the light shielding state, so that the user's eyes may not observe an image of the flashing signal S1. In other words, in the embodiment, the first switching time T1 is substantially greater than or equal to a sum of the time T103 required for switching the first LCS 210 from the light transmitting state to the light shielding state, the time T105 required for switching the second LCS 220 from the light shielding state to the light transmitting state, and the synchronization time T101.

In the embodiment, since the first switching time T1 is substantially equal to the time for the second sub compensation zone 322b passing through the light beam 312, and the second switching time T2 is substantially equal to a sum of time for the first sub compensation zone 322a, the second sub compensation zone 322b, and the third sub compensation zone 322c sequentially passing through the light beam 312, the color wheel 320 of the projection display system 100a of the embodiment may still apply the color wheel 320 of FIGS. 2-4, and implementations of the color wheel may refer to the above related description, and therefore detailed description thereof is not repeated. In other words, the projection display system 100a of the embodiment also has the advantages of the aforementioned projection display system 100.

Moreover, since the corresponding control methods of different projection display systems are slightly different, a control method of the projection display system 100a is similar to the control method referred in FIG. 5, and a difference is described as follows. During the synchronization time T101 that is after the time T103 required for switching the first LCS 210 from the light transmitting state to the light shielding state, and before the time T105 required for switching the second LCS 220 from the light shielding state to the light transmitting state, the method for controlling the projection display system 100a further includes receiving the flashing signal S1 sent by the projection apparatus 300 during the synchronization time T101, wherein the second sub frame time (the aforementioned first switching time T1) is substantially greater than or equal to a sum of the time T103 required for switching the first LCS 210 from the light transmitting state to the light shielding state, the time T105 required for switching the second LCS 220 from the light shielding state to the light transmitting state, and the synchronization time T101 as shown in FIG. 6A and FIG. 6B.

Figure 7:
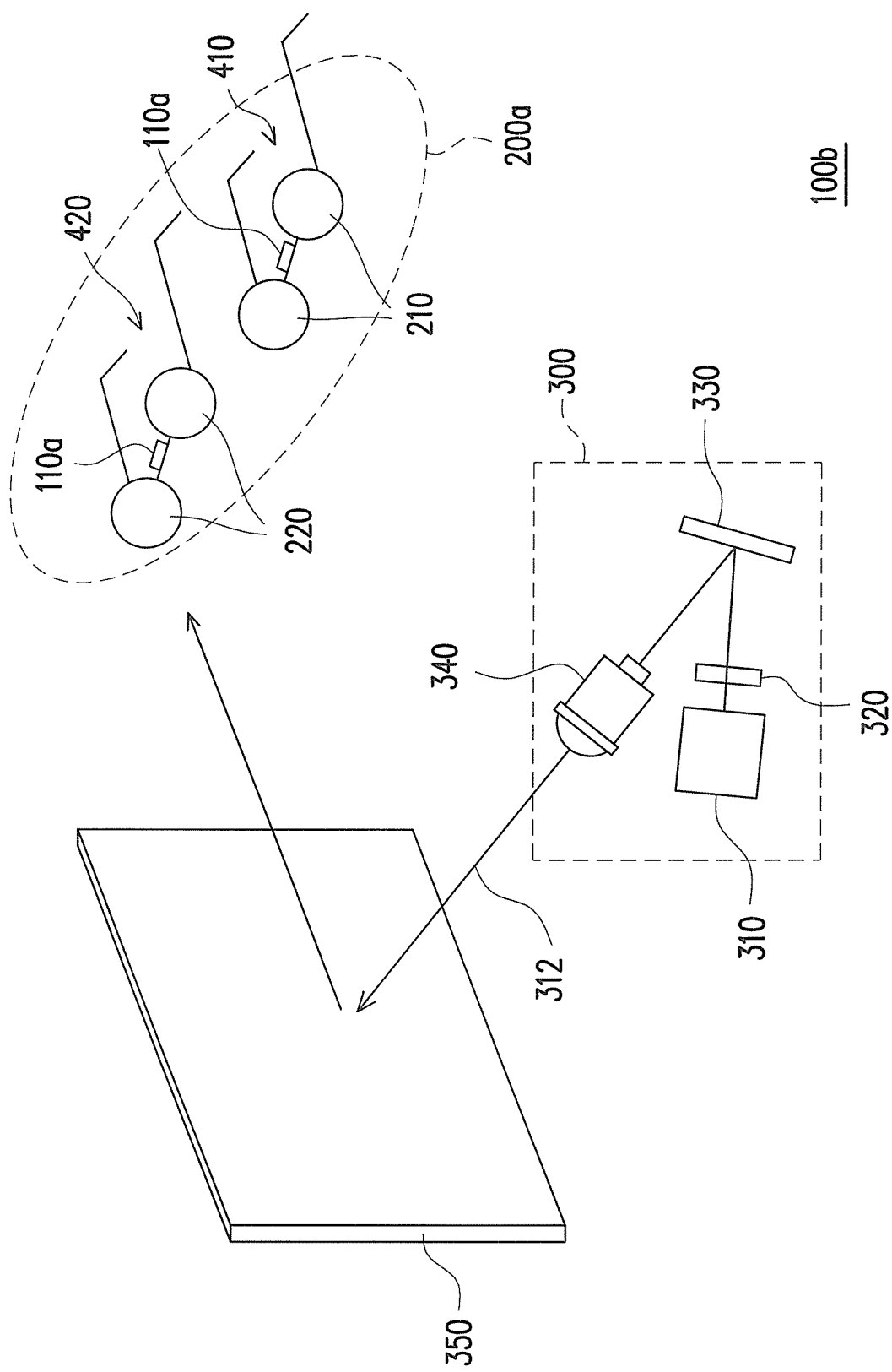
FIG. 7 is a schematic diagram illustrating a projection display system according to another embodiment of the invention.

Referring to FIG. 1A, FIG. 1C and FIG. 7, the projection display system 100b of the embodiment is similar to the projection display system 100, and a difference between the projection display systems 100b and 100 is that the glasses system 200a includes a first pair of liquid crystal glasses 410 and a second pair of liquid crystal glasses 420, the first pair of liquid crystal glasses 410 includes two aforementioned first LCSs 210, and the second pair of liquid crystal glasses 420 includes two aforementioned second LCSs 220.

In the projection display system 100b, since a projection method of the projection apparatus 300 applies the color sequence shown in FIG. 1C, image information may be observed through the first pair of liquid crystal glasses 410 during a second image time (i.e. the image time required for a plurality of the color zones and the first sub compensation zone sequentially passing through the light beam), and another image information may be observed through the second pair of liquid crystal glasses 420 during a first image time (i.e. the image time required for the third sub compensation zone and the color zones sequentially passing through the light beam), so that two users respectively wearing the first pair of liquid crystal glasses 410 and the second pair of liquid crystal classes 420 may respectively observe different images. In other words, besides displaying the 3D images, when the projection apparatus 300 of the projection display system 100b of the embodiment is used together with different glasses system 200a, the projection display system 100c may have a dual image display function.

Each pair of the liquid crystal glasses 410 and 420 has a driving unit 110a, and the driving unit 110a may apply the aforementioned driving voltage V1 to each pair of the liquid crystal glasses 410 and 420, so that the liquid crystal glasses 410 and 420 may be respectively switched between the light shielding state and the light transmitting state as shown in FIG. 1C and FIG. 7.

In summary, the embodiment or embodiments of the invention may have at least one of the following advantages.

In the projection display system according to the embodiments of the invention, by dividing the compensation zone of the color wheel into the first sub compensation zone, the second sub compensation zone, and the third sub compensation zone, the time for the second sub compensation zone passing through the light beam provided by the illumination system is substantially equal to the first switching time of the glasses system, and a sum of time for the first sub compensation zone, the second sub compensation zone, and the third sub compensation zone sequentially passing through the light beam is substantially equal to the second switching time of the glasses system. In this way, a brightness and color performance of the displayed image are improved. Moreover, in a variation example, the compensation zone may further include a fourth sub compensation zone, and the projection display system also has the above advantages.

Moreover, the first LCS and the second LCS of the liquid crystal glasses respectively have a normally white mode and a normally black mode. Therefore, when the driving voltage is simultaneously applied or removed, the first LCS and the second LCS may respectively receive different images at different time, so as to achieve an effect of receiving the 3D images. In addition, the embodiment of the invention also provides a method for controlling the aforementioned projection display system, and by the controlling method, a good 3D image may be presented.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection display system, comprising:
a glasses system, comprising at least one first liquid crystal shutter and at least one second liquid crystal shutter;
a driving unit, electrically connected to the glasses system, wherein when the driving unit respectively applies a first driving voltage and a second driving voltage to the first liquid crystal shutter and the second liquid crystal shutter, the first liquid crystal shutter is switched from a light transmitting state to a light shielding state within a first switching time, and the second liquid crystal shutter is switched from the light shielding state to the light transmitting state within the first switching time, and after the first driving voltage and the second driving voltage respectively applied on the first liquid crystal shutter and the second liquid crystal shutter are removed, the first liquid crystal shutter is switched from the light shielding state to the light transmitting state within a second switching time, and the second liquid crystal shutter is switched from the light transmitting state to the light shielding state within the second switching time; and
a projection apparatus, comprising an illumination system and a color wheel, wherein the illumination system is capable of providing a light beam, and the color wheel is disposed in a transmission path of the light beam, and after the light beam passes through the color wheel, the light beam is transmitted to the glasses system, the color wheel has a compensation zone and a plurality of color zones, and when the color wheel is rotated, the compensation zone and the color zones sequentially pass through the light beam, the compensation zone has a first sub compensation zone, a second sub compensation zone, and a third sub compensation zone, wherein the second sub compensation zone is located between the first sub compensation zone and the third sub compensation zone, and a time for the first sub compensation zone passing through the light beam is substantially equal to a time for the third sub compensation zone passing through the light beam, wherein the first switching time is substantially equal to a time for the second sub compensation zone passing through the light beam, and the second switching time is substantially equal to a sum of time for the first sub compensation zone, the second sub compensation zone, and the third sub compensation zone sequentially passing through the light beam.

2. The projection display system as claimed in claim 1, wherein the first liquid crystal shutter comprises a first liquid crystal panel, a first polarizer, and a second polarizer, the first liquid crystal panel has a first surface and a second surface opposite to the first surface, and the first polarizer and the second polarizer are respectively disposed on the first surface and the second surface, the second liquid crystal shutter comprises a second liquid crystal panel, a third polarizer, and a fourth polarizer, the second liquid crystal panel has a third surface and a fourth surface opposite to the third surface, and the third polarizer and the fourth polarizer are respectively disposed on the third surface and the fourth surface.

3. The projection display system as claimed in claim 2, wherein the first polarizer has a first polarization direction, the second polarizer has a second polarization direction, the third polarizer has a third polarization direction, and the fourth polarizer has a fourth polarization direction, the first polarization direction is perpendicular to the second polarization direction, and the third polarization direction is parallel to the fourth polarization direction.

4. The projection display system as claimed in claim 1, wherein colors of the first sub compensation zone, the second sub compensation zone, and the third sub compensation zone are the same.

5. The projection display system as claimed in claim 1, wherein colors of the first sub compensation zone and the third sub compensation zone are the same, and a color of the second sub compensation zone is different from colors of the first sub compensation zone and the third sub compensation zone.

6. The projection display system as claimed in claim 1, wherein a color of the compensation zone is the same to a color of one of the color zones of the color wheel.

7. The projection display system as claimed in claim 1, wherein the compensation zone further comprises a fourth sub compensation zone, and after the third sub compensation zone passes through the light beam, the fourth sub compensation zone and the color zones sequentially pass through the light beam.

8. The projection display system as claimed in claim 1, wherein when the first liquid crystal shutter is in the light transmitting state, and the second liquid crystal shutter is in the light shielding state, the color zones and the first sub compensation zone of the color wheel sequentially pass through the light beam.

9. The projection display system as claimed in claim 8, wherein during the first switching time of applying the first driving voltage and the second driving voltage, the first liquid crystal shutter is switched from the light transmitting state to the light shielding state, and the second liquid crystal shutter is switched from the light shielding state to the light transmitting state, and the second sub compensation zone passes through the light beam.

10. The projection display system as claimed in claim 9, wherein when the first liquid crystal shutter is in the light shielding state, and the second liquid crystal shutter is in the light transmitting state, the third sub compensation zone and the color zones sequentially pass through the light beam.

11. The projection display system as claimed in claim 10, wherein after the first driving voltage and the second driving voltage respectively applied on the first liquid crystal shutter and the second liquid crystal shutter are removed, the first liquid crystal shutter is switched from the light shielding state to the light transmitting state, and the second liquid crystal shutter is switched from the light transmitting state to the light shielding state, and the first sub compensation zone, the second sub compensation zone, and the third sub compensation zone sequentially pass through the light beam.

12. The projection display system as claimed in claim 1, further comprising a light sensor disposed in the glasses system, the light sensor being capable of receiving a flashing signal sent by the projection apparatus during a synchronization time,
wherein a generation sequence of the synchronization time is after a time required for switching the first liquid crystal shutter from the light transmitting state to the light shielding state, and before a time required for switching the second liquid crystal shutter from the light shielding state to the light transmitting state, the first switching time is greater than or equal to a sum of the time required for switching the first liquid crystal shutter from the light transmitting state to the light shielding state, a time required for switching the second liquid crystal shutter from the light shielding state to the light transmitting state, and the synchronization time.

13. The projection display system as claimed in claim 1, wherein the at least one first liquid crystal shutter refers to two first liquid crystal shutters, and the at least one second liquid crystal shutter refers to two second liquid crystal shutters, the glasses system comprises a first pair of liquid crystal glasses and a second pair of liquid crystal glasses, wherein the first pair of liquid crystal glasses comprises the two first liquid crystal shutters, and the second pair of liquid crystal glasses comprises the two second liquid crystal shutters.

14. A control method, for controlling a projection display system, wherein the projection display system comprises a glasses system and a projection apparatus, the glasses system comprises a first liquid crystal shutter and a second liquid crystal shutter, and the projection apparatus comprises an illumination system and a color wheel, the illumination system is capable of providing a light beam, and after the light beam passes through the color wheel, the light beam is transmitted to the glasses system, the color wheel has a compensation zone and a plurality of color zones, and when the color wheel is rotated, the compensation zone and the color zones sequentially pass through the light beam, the compensation zone has a first sub compensation zone, a second sub compensation zone, and a third sub compensation zone, wherein the second sub compensation zone is located between the first sub compensation zone and the third sub compensation zone, and the control method is adapted to control the projection display system during a plurality of successive frame times, wherein each of the frame times comprises a first sub frame time, a second sub frame time, a third sub frame time, and a fourth sub frame time, the control method comprising:
during the first sub frame time, making the first liquid crystal shutter be in a light transmitting state, making the second liquid crystal shutter be in a light shielding state, and making the color zones and the first sub compensation zone sequentially pass through the light beam;
during the second sub frame time, respectively applying a first driving voltage and a second driving voltage to the first liquid crystal shutter and the second liquid crystal shutter, whereby the first liquid crystal shutter is switched from the light transmitting state to the light shielding state, the second liquid crystal shutter is switched from the light shielding state to the light transmitting state, and the second sub compensation zone passes through the light beam, wherein the second sub frame time is substantially equal to a time for the second sub compensation zone passing through the light beam;
during the third sub frame time, making the first liquid crystal shutter be in the light shielding state, and making the second liquid crystal shutter be in the light transmitting state, and making the third sub compensation zone and the color zones sequentially pass through the light beam; and
during the fourth sub frame time, respectively removing the first driving voltage and the second driving voltage applied on the first liquid crystal shutter and the second liquid crystal shutter, whereby the first liquid crystal shutter is switched from the light shielding state to the light transmitting state, the second liquid crystal shutter is switched from the light transmitting state to the light shielding state, and the first sub compensation zone, the second sub compensation zone, and the third sub compensation zone sequentially pass through the light beam, wherein the fourth sub frame time is substantially equal to a time for the compensation zone passing through the light beam, and a time for the first sub compensation zone passing through the light beam is substantially equal to a time for the third sub compensation zone passing through the light beam.

15. The control method as claimed in claim 14, wherein a method for respectively applying the first driving voltage and the second driving voltage to the first liquid crystal shutter and the second liquid crystal shutter comprises transmitting a control signal from the projection apparatus to the glasses system through cable transmission or wireless transmission, so as to control a driving unit electrically connected to the glasses system to respectively apply the first driving voltage and the second driving voltage to the first liquid crystal shutter and the second liquid crystal shutter.

16. The control method as claimed in claim 14, wherein the compensation zone further comprises a fourth sub compensation zone, and the control method further comprises:
   during the third sub frame time, making the third sub compensation zone, the fourth sub compensation zone, and the color zones sequentially pass through the light beam.

17. The control method as claimed in claim 14, wherein the compensation zone further comprises a fourth sub compensation zone, and the control method further comprises:
   during the first sub frame time, making the color zones, the fourth sub compensation zone, and the first sub compensation zone sequentially pass through the light beam.

18. The control method as claimed in claim 14, wherein colors of the first sub compensation zone, the second sub compensation zone, and the third sub compensation zone are the same.

19. The control method as claimed in claim 14, wherein a color of the compensation zone is the same as a color of one of the color zones.

20. The control method as claimed in claim 14 further comprising:
   during a synchronization time after a time required for switching the first liquid crystal shutter from the light transmitting state to the light shielding state and before a time required for switching the second liquid crystal shutter from the light shielding state to the light transmitting state, receiving a flashing signal sent by the projection apparatus during the synchronization time, wherein the second sub frame time is greater than or equal to a sum of the time required for switching the first liquid crystal shutter from the light transmitting state to the light shielding state, a time required for switching the second liquid crystal shutter from the light shielding state to the light transmitting state, and the synchronization time.

21. The control method as claimed in claim 14, wherein the at least one first liquid crystal shutter refers to two first liquid crystal shutters, and the at least one second liquid crystal shutter refers to two second liquid crystal shutters, and the glasses system comprises a first pair of liquid crystal glasses and a second pair of liquid crystal glasses, wherein the first pair of liquid crystal glasses comprises the two first liquid crystal shutters, and the second pair of liquid crystal glasses comprises the two second liquid crystal shutters.

* * * * *